June 14, 1955     G. H. MILLER     2,710,541
APPARATUS FOR VOLUME MEASUREMENT
Filed May 19, 1950
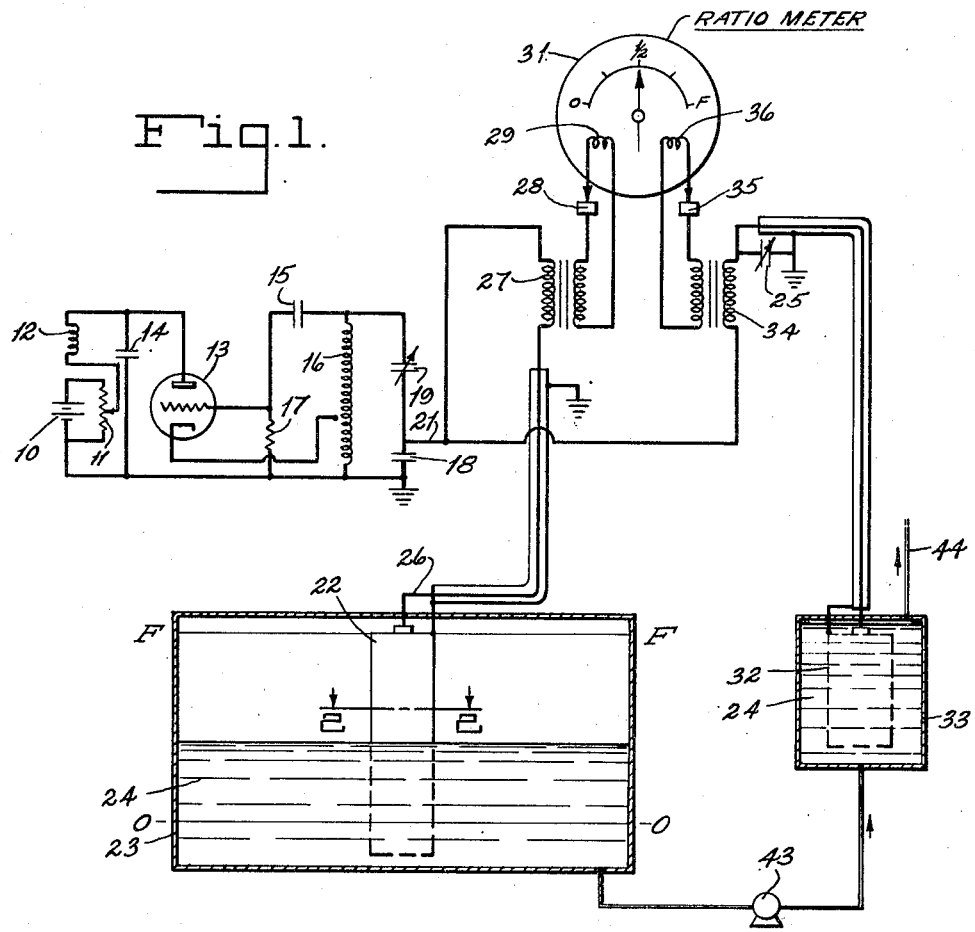
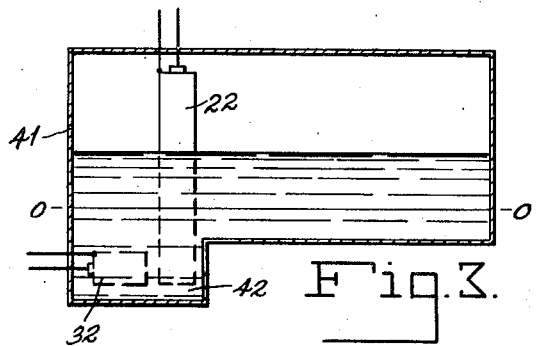
INVENTOR.
GORDON H. MILLER
BY
ATTORNEYS 2,710,541
Patented June 14, 1955

2,710,541

APPARATUS FOR VOLUME MEASUREMENT

Gordon H. Miller, Port Arthur, Tex., assignor to The Texas Company, New York, N. Y., a corporation of Delaware Application May 19, 1950, Serial No. 162,874

4 Claims. (Cl. 73—304)

This invention relates to volume measurement and more particularly to the measurement of volumes of liquid such as fuel in containers which are subjected to angular displacement as occurs in fuel tanks in aircraft.

Electrically sensitive elements such as condensers have been employed in such containers as the element of the measuring device in contact with the liquid, the capacity thereof varying in accordance with changes in the volume of liquid in the container. This follows because of the change in dielectric medium between the condenser elements as the volume of liquid in the container changes. In arrangements hitherto proposed, the varying capacity of the condenser in the container is weighed against a fixed capacity outside the container, the differences in capacity being utilized to operate a suitably calibrated indicator. These arrangements are subject to inaccuracies because of the numerous different types of liquids such as fuels that may be used, changes in temperature, changes in the water and air content of the liquid and like factors which operate to change the character of the dielectric medium and accordingly change the capacity of the condenser.

In improving over the prior art, it is an object of this invention to provide an arrangement for measuring liquid volumes in containers wherein certain characteristics of the liquid contained therein and other variable factors tending to introduce error into the measurements are compensated for.

A further object of the invention is the provision of novel measuring means of the general type above-described wherein the fixed capacity against which the varying capacity of the condenser in the liquid is weighed is made subject to the same variable factors influencing the condenser whereby possibility of error introduced by reason of different types of liquids, changes in temperature and changes in water and air content of the liquid is substantially eliminated.

Further objects and advantages of the invention will appear from the following description and claims taken in connection with the attached drawing wherein:

Fig. 1 is a diagrammatic showing of a preferred embodiment of the invention.

Fig. 2 is a section taken on the line 2—2 of Fig. 1.

Fig. 3 is a diagrammatic showing in section of another preferred embodiment of the invention.

In brief, the present invention is directed to a measuring device wherein an electrically-sensitive element is positioned in a container of liquid, the volume of which it is desired to measure, with a certain electrical characteristic of this element being compared with that of another electrically-sensitive element having known fixed value for the same characteristic, the difference being utilized to provide an indication of the volume of liquid in the container, the latter element being subjected to liquid of the same type as that being measured in the container, whereby changes in types of liquid, changes in temperature, water and air content of the liquid and like variables are compensated for.

The invention also contemplates the positioning of the second or fixed characteristics value element in a separate but like body of liquid or in the liquid in the container wherein the first element is positioned. It is assumed that any fuel tank will have a minimum level below which it will be undesirable to go. This level is indicated by the lines O—O in Figures 1 and 3. It will be desirable for the fuel gage to indicate an empty tank when the liquid level is at O—O. The invention contemplates the proportioning of the two elements in electrical characteristics so that the second element has a characteristic when totally submerged in the liquid substantially equal to the characteristic of the first or measuring element when the liquid level in the fuel tank is at O—O. The invention further contemplates that the volume of the reserve liquid in the container will be enough when the level is at O—O to provide a reasonable degree of immersion of the lower extremity of the first or measuring element. This may be assured by providing a well in the bottom of the container as in Figure 3.

For an illustration of a preferred embodiment of the invention, attention is called to Figs. 1 and 2. The volume measuring and indicating means shown in Fig. 1 includes an oscillator circuit comprising a power supply 10 with a shunt 11 connected through a choke 12 to the plate of an oscillator tube 13, a plate by-pass condenser 14, a grid blocking condenser 15, an oscillator coil 16, a grid resistor 17, a padder condenser 18, and a tuning or variable condenser 19, the various elements being connected as shown in the drawing. Preferably, the oscillator circuit is designed as a 20 kc. oscillator feeding a 65 v. signal into the tank gauge circuit through line 21.

A condenser 22, preferably of the concentric type as shown in section in Fig. 2, is mounted in fluid tank 23 containing fuel 24, the leads from the condenser being taken off through a shielded cable as shown. The outer lead from condenser 22 is grounded. The inner lead 26 of the condenser is connected into transformer 27, the other side of which is connected through a rectifier 28 to coil 29 in a D. C. ratio meter 31.

A condenser 32, preferably similar to condenser 22, is mounted in a container or cell 33 which is also filled with fuel 24 so that the condenser is predeterminately, preferably totally, submerged or immersed at all times. Advantageously the comparison cell 33 is immersed in the liquid level in the fuel tank in such a way that the fuel is pumped through the cell by means of pump 43 to the power plant through line 44 thus assuring that the comparison cell is always filled with fuel which is representative of that contained in the tank. The cell 33 may be located in the fuel tank below the liquid level O—O as a further means for eliminating possible temperature differences.

The leads from condenser 32 are taken off in the manner shown by a shielded connection, the outer lead being grounded as shown and also connected to the inner lead through a variable condenser 25, the purpose of which is later described. The inner lead is connected into one side of transformer 34, the opposite side of the transformer being connected into a rectifier 35 and coil 36 in the D. C. ratio meter.

In operation, the signal fed from the oscillator which is varied by the varying capacity of condenser 22 in accordance with changes in the volume of fuel in tank 23, functions through coil 29 to deflect the needle of the ratio meter. The circuit including condenser 32 which is of predetermined fixed capacity operates to urge the same needle in the opposite direction. When the capacities of the two condenser circuits are the same, the ratio meter needle will be in a neutral position. This will correspond to a zero reading on the dial of the instrument.

Preferably the arrangement is such that the neutral or zero position of the ratio meter corresponds to a liquid level which may be regarded as an empty tank for all practical purposes but should be enough to provide a margin of safety. This level is indicated at O—O in Figures 1 and 3. Unless provision is made for pumping the fuel through the cell, this level must be high enough to completely immerse the comparison cell. In any case the capacitance of this cell should be approximately equal to the capacitance of the submerged portion of the indicating cell. In other words, the indicating cell is so constructed that a portion of it would be immersed when the level of the fuel in the tank is at the zero or "empty" position on the gauge. This condenser in effect would have two capacitances, one due to that portion immersed in the liquid and the other due to the larger part of the condenser which would be in the vapor space above the liquid level.

The adjustable condenser 25 is required to set the indicating gauge to the zero point. This condenser should be large enough to compensate for the capacitance of that portion of the indicating cell which is in the vapor space. This condenser may be so located that it can be adjusted at the time the fuel gauge is being calibrated, after which it will remain fixed and become an integral part of the circuit.

The line F—F in Figure 1 represents the level in the container when the tank gauge reads full. A deflection of 100% on the D. C. ratio meter 31, which corresponds to the full position on the dial, is obtained by varying the potential on the plate of the oscillator tube 13 as necessary to regulate the strength of the signal. This may be done by selecting the proper voltage on the shunt resistance 11.

By reason of condenser 32 being completely submerged in fuel of the same type as in fuel tank 23 at all times, its capacity will be affected by variables such as fuel quality, temperature and the like in exactly the same way that condenser 22 is affected. Assuming the same cross-sectional area in both condensers and the same details of construction, condenser 32 will be approximately the size of the submerged portion of the indicating cell when the liquid level is at O—O level in the container.

Fig. 3 illustrates a fuel tank 41 having a well 42 therein wherein comparison condenser 32 is maintained totally submerged and a greater portion of the indicating cell may be submerged than is possible if the arrangement shown in Fig. 1 is used. This arrangement may be used where angular displacement of the fuel tank will not be to a degree such as to empty well 42 in whole or in part.

While with some variables, as with temperature, the effect upon the reading is minimized by reason of the tendency for the effect of volume change and dielectric constant to offset each other. These changes are not of the same order of magnitude and it has been found that there is a net effect due to changes of temperature, as evidenced, attention is called to the data contained in Table I below indicating that for a total change in volume of 8.90%, the dielectric constant changed only 5.6%.

*Table 1*

| Temp., ° F. | Change in Volume Percent | Dielectric Constant K |
|---|---|---|
| −40 | −6.94 | 2.022 |
| 77 | 0.00 | |
| 105 | 1.96 | 1.908 |
| Total Change, percent | 8.90 | 5.6 |

From the above, it is believed evident that the present invention provides an efficient yet relatively simple method of compensating for variables that have hitherto proved sources of inaccuracy in the measurement of liquid volumes.

It is to be understood that the foregoing example is purely by way of illustration and that other electrical arrangements can be used employing the same basic principles as disclosed in the present invention.

Obviously many modifications and variations of the invention, as hereinbefore set forth, may be made without departing from the spirit and scope thereof and, therefore, only such limitations should be imposed as are indicated in the appended claims.

I claim:
1. Apparatus for indicating the level of a liquid contained in a tank comprising: a first capacitor means including a pair of plates in spaced-apart relationship within the tank and variably immersible in a fluid therein in accordance with how full said tank is therewith; second capacitor means including another pair of spaced-apart plates; means effective, whenever said tank contains any more fluid than a predetermined small fraction of its capacity therefor, to fully immerse said second pair of plates in a portion of said fluid; and means comprising an indicator having two inputs and an electronic oscillator having for the actuation of said indicator a common resonant circuit coupled to both of its said inputs over respective circuits each of which includes a different one of said capacitor means, for producing on a reference scale of the indicator different predetermined indications whenever the capacitances of the first and second capacitor means have certain respective predetermined ratios, whereby said last-mentioned means will be effective whenever the tank is filled to certain respective predetermined levels to produce said different indications with substantially equal accuracy for a variety of liquids.

2. Apparatus as in claim 1 in which the tank is connected to an output conduit for carrying fluid to a fluid-utilization device; said means for immersing the second-mentioned pair of plates includes a relatively small size hollow cell which contains them; and said cell is connected in series with said output conduit so that fluid transferred thereby from the tank toward the utilization device passes through the cell.

3. Apparatus as in claim 1 in which the means for producing indications includes: a ratio-meter; two circuits which have a common connection to a circuit point of said resonant circuit, extending individually to the two inputs of the ratio-meter and each includes effectively-in-series a respective one of said capacitor means; and means for adjusting the magnitude of the alternating voltage provided at said circuit point by said oscillator so that the ratio-meter will produce a predetermined indication near an end of its reference scale when the capacitances of said capacitor means have a predetermined ratio.

4. Apparatus as in claim 1 in which said means for producing indications includes: a ratio-meter; and circuit means having two branches separately connecting a single circuit point of said resonant circuit to the two inputs of the ratio-meter and respectively serially including said two capacitor means; and means for adjusting the total effectively-in-series capacitance in each of said branches so that the ratio-meter will produce a predetermined indication near the center of said reference scale when the capacitances of said capacitor means have a predetermined ratio corresponding substantially to the half-full condition of said tank.

References Cited in the file of this patent
UNITED STATES PATENTS

| | | |
|---|---|---|
| 2,300,562 | Freystedt | Nov. 3, 1942 |
| 2,357,023 | Reid et al. | Aug. 29, 1944 |
| 2,377,275 | Smith | May 29, 1945 |
| 2,541,743 | Brockman et al. | Feb. 13, 1951 |
| 2,563,280 | Schafer | Aug. 7, 1951 |
| 2,581,085 | Edelman | Jan. 1, 1952 |

FOREIGN PATENTS

| | | |
|---|---|---|
| 441,576 | Great Britain | Jan. 22, 1936 |
| 114,980 | Sweden | July 19, 1945 |